(12) United States Patent
Honda

(10) Patent No.: US 6,259,675 B1
(45) Date of Patent: Jul. 10, 2001

(54) COMMUNICATION MONITORING APPARATUS

(75) Inventor: Yoshizou Honda, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 09/048,370

(22) Filed: Mar. 26, 1998

(30) Foreign Application Priority Data

Mar. 28, 1997 (JP) .................................................... 9-078486

(51) Int. Cl.[7] .................................................. H04L 12/26
(52) U.S. Cl. .......................................... 370/248; 370/250
(58) Field of Search .................................... 370/241, 242, 370/245, 246, 252, 401, 244, 248, 250; 709/224

(56) References Cited

U.S. PATENT DOCUMENTS 5,572,533 * 11/1996 Sunada et al. ...................... 714/712
6,023,775 * 2/2000 Fujii ...................................... 714/48

* cited by examiner

Primary Examiner—Chau Nguyen
Assistant Examiner—Alexander O. Boakye
(74) Attorney, Agent, or Firm—Fish & Richardson P.C.

(57) ABSTRACT

The present invention has the objective of offering an apparatus which comprehensively monitors networks which include small-scale computers and small-scale management protocols which are to be installed. In order to achieve the above objective, with respect to a system formed by a computer 22 and an analyzing apparatus 32 which are connected to a network 12, the present invention has the computer 22 connected to a network 52, and the computer 22 transmits a bit array received via the network 52 to the analyzing apparatus 32 as data. And the analyzing apparatus 32 analyzes the bit array, transmits the analysis result to the computer 22, and aides in the communication of the computer 22.

7 Claims, 2 Drawing Sheets

COMMUNICATION MONITORING APPARATUS

BACKGROUND OF THE INVENTION

1. Technical Field of the Invention

The present invention relates to communication monitoring apparatuses. More particularly, it relates to communication monitoring apparatuses which monitors the transfer of data communications performed among computers which are connected over a network.

2. Description of the Related Art

Because communication monitoring apparatuses prevent trouble over networks beforehand and are aware of how the networks are being used, they are used on different types of networks to understand locations which may produce trouble over networks. For example, a communication monitoring apparatus on a local area network (hereinafter, referred to as LAN) commonly use a management standard called SNMP (Simple Network Management Protocol). Relevant facts of standards which are conventionally used for communication monitoring apparatuses will be explained below.

FIG. 4 is a diagram which illustrates a simplified structure of a typical communication monitoring apparatus within a LAN. In FIG. 4, 10 is a network such as a LAN. A plurality of computers 20 and analyzing apparatuses 30 are connected to this network 10. In FIG. 4, only one computer 20 and only one analyzing apparatus 30 is illustrated and any others have been omitted from this diagram. Also, in addition to the computer 20 and the analyzing apparatus 30, relaying apparatuses such as routers and repeaters are connected to this network 10.

The above mentioned computer 20 may be, for example, a general personal computer. It may be equipped with a card to connect to a LAN such as an ethernet card, and is connected to the network 10. Also, the analyzing apparatus 30 monitors the status of the communication at location where the computer 20 is connected, and is a console having a processing means for a network administrator. This processing means may be, for example, a software for collecting data on the amount of communication in units of time at the location where the computer 20 is connected.

A communication protocol for allowing communication via the network 10 is installed in the above mentioned computer 20 and the analyzing apparatus 30. Hereinafter, the expression "the computer is connected to the network" signifies that the computer is able to perform data communication with other computers connected to the network.

The above mentioned network 10 may be formed, for example, by a bus-type network standard such as the ethernet, and may use CSMA/CD (Carrier Sense Multiple Access with Collision Detection) as the transmission right controller, and may use TCP/IP (Transmission Control Protocol/Internet Protocol) and such as the communication protocol.

Moreover, the computer 20 and the analyzing apparatus 30 possess a protocol for communicating network management information usually called SNMP protocol group. According to the standard, RMON (Remote Network Monitoring), which is chosen here as an example of the processing procedure relating to network monitoring, the computer 20 takes a data packet transferred over a LAN, executes an analyzing process, and creates and updates a management information table which is set beforehand such as MIB (Management Information Base).

In order for the analyzing apparatus 30 to obtain this management information table, the analyzing apparatus 30 transmits a set command to the computer 20. In accordance with the received command, the computer 20 extracts desired information from the management information table and transmits the management information to the analyzing apparatus 30. The analyzing apparatus 30 collects the management information from a plurality of locations, not illustrated in the diagram, in a similar manner. It then executes an analyzing process of the status of communications, and performs a process of displaying the information to the network administrator.

The above mentioned conventional communication monitoring apparatuses have the objective of management of networks of simple structure such as LAN's. Although these communication monitoring apparatuses are appropriate for use on a simple-structured network, they are not appropriate for networks including small scale terminals ard apparatuses or networks which perform communication by selecting different communication methods, as explained below.

Here, the above mentioned small scale terminals and apparatuses may be, for example, terminals which have limitations such as battery, weight or size restrictions as in portable terminals. Also, the above mentioned networks which perform communication by selecting different communication methods may be, for example, networks which allows the selection of an appropriate communication protocol from among a plurality of communication protocols in cases where a plurality of communication protocols are mixed within a network or where an appropriate network is selected from a plurality of networks of different types which are all connected to a network for the objective of realizing a working communication.

In the conventional method, the protocol for performing the transfer of network management information which is installed in the computer 20 and the analyzing apparatus 30 is too large to install in small scale terminals and apparatuses such as portable terminals. As a result, the burden carried by the computer 20 and the analyzing apparatus 30 is great. Moreover, the selection range of the communication protocols of the network 10 has increased and has correspondingly become complicated. Then, the management information tables become complicated even for conventional LAN's. Yet, the commands become further complicated. And in the end, the scale of the protocol software installation become even more larger.

The installing of the above mentioned analyzing process which the computer 20 is performing according to the conventional method in the small scale terminals and apparatuses such as the portable terminals also increases the burden of the computer 20.

Additionally, in the conventional method, when a specified computer selects an appropriate communication protocol from among a plurality of communication protocols and realizes the desired communication, information relating to the communication quality is transferred from the computer 20 to the analyzing apparatus 30. Consequently, because the specified computer aides in the selection of a communication protocol, it is not possible for the specified computer to use the information from the analysis result.

Further, when a plurality of networks of different types are connected and an appropriate network is selected from among the networks to realize communication, that is, in a, communication environment where different types of networks coexist, in order to perform communication monitoring in each of the networks, it is necessary to install a monitoring means identical to the communication protocol of the analyzing process and network management information installed in the computer 20 into the computers of each of the networks according to the conventional method.

Therefore, although analysis is performed for each of the networks, there is a problem of not being able to easily obtain a comprehensive information of the entire network in the case where specified small scale terminals do not have installed any means for analyzing which network is appropriate for performing their desired communication.

Additionally, in the case where a certain terminal is connected to a public network, for example, the terminal uses a public telephone line to connect to a specified LAN, the network monitoring means which is connected to that LAN is unable to obtain information relating to the status of communications of the public network and is unable to easily express the information relating to the appropriateness of the public network selection to the terminal and the terminal user.

SUMMARY OF THE INVENTION

The present invention has the objective of offering a communication monitoring apparatus which is able to analyze the status of the communications without having large-scale installations in computers or analyzing apparatuses.

In addition, the present invention has the objective of offering a communication monitoring apparatus which is able to understand the status of communications with respect to each of the communication protocols, even for networks where different types of communication protocols coexist.

Further, even when communications is performed via different types of networks, the present invention has the objective of offering a communication monitoring apparatus which is able to understand the circumstances of communications of the entire network.

In order to achieve the above mentioned objectives, the present invention comprises a terminal which is connected to two networks and which converts a bit array which is demodulated and received from the second network into a predetermined protocol of the first network and transfers the converted bit array to the first network, and an analyzing apparatus which is connected to the first network and which monitors the second network by receiving and analyzing the bit array transferred from the terminal to the first network.

The present invention has the effect of having the analyzing apparatus indirectly monitor the second network even though it is not directly connected to the second network.

In addition, there is a simplification in the structure of the analyzing apparatus, since it is not necessary to install a protocol for communications monitoring in the terminal which is connected to the second network.

Additionally, the present invention comprises a connecting apparatus which connects the first and the second networks by acting as a relay between the two networks, a terminal which is connected to the second network and which transfers a bit array which is demodulated and received from the second network to the second network by using a predetermined protocol of the second network, and an analyzing apparatus which is connected to the first network and which monitors the second network by receiving and analyzing the bit array transferred to the first network via the connecting apparatus.

According to the present invention, since there is no need to install both the communications protocol used in the second network and the communications protocol used in the first network in the terminal, there is an effect of a simplification of the terminal.

Further, it is desirable for the terminal of the present invention to comprise a means for relaying communications in the second network.

In addition, in the case where a plurality of communications protocols are used within the second network, it is desirable for the analyzing apparatus to comprise a means for transferring the analysis result to the terminal, and it is desirable for the terminal to comprise a means for receiving the analysis result transferred from the analyzing apparatus, for selecting a predetermined communications protocol from among the plurality of communications protocols based on the analysis result, and for communicating by employing the selected communications protocol.

Additionally, in the present invention, the terminal is connected to all the networks, from the third to the Nth networks (where N is an integer greater or equal to 3), and converts the bit arrays which are demodulated and received from each of the networks, from the third to the Nth networks, into a predetermined protocol of the first network and transmits those converted bit arrays to the first network. The analyzing apparatus, then, monitors the second through the Nth networks by receiving and analyzing the bit arrays transferred from the terminal to the first network.

Moreover, in the present invention, the terminal is connected to all the networks, from the third to the Nth networks (where N is an integer greater or equal to 3), and transfers the bit arrays which were demodulated and received from each of the networks to each of the networks based on a predetermined protocol, and the analyzing apparatus monitors the second through the Nth networks by receiving and analyzing the bit arrays which are transferred from the second through the Nth networks via the connecting apparatus.

Furthermore, the analyzing apparatus transfers the analysis result to the first network, while the terminal receives the analysis result transferred from the analyzing apparatus and selects a network from among the second through the Nth networks, and thereby performs communications.

Additionally, the terminal is connected to a predetermined network from among the second through the Nth networks, receives the analysis result transferred from the analyzing apparatus, and selects a network from among the second through the Nth networks, and thereby performs communications.

Moreover, after a partial masking or an encoding process, the terminal transmits to the analyzing apparatus the bit array which is demodulated and received from the second through the Nth networks.

According to the above described invention, there is an effect of allowing the analyzing apparatus to monitor the second network simply by adding a means for transmitting the received bit array to not only the above mentioned terminal, but also to a relaying apparatus.

Additionally, when the terminal realizes the intended communications, there is an effect of being able to select the communications protocol by using the analysis result from the analyzing apparatus and without having the terminal analyze the status of the network when executing communications with a specified communications protocol selected from among a plurality of communications protocols.

Moreover, there is an effect of having the analyzing apparatus be able to monitor each of the networks even when the analyzing apparatus is connected to a number of networks in addition to the second network.

Furthermore, with respect to a network which integrates networks of different types, there is an effect of flexibility in the monitoring of the integrated network even when deintegration occurs frequently.

In addition, there is an effect of lessening the burden of the terminal because the analysis result of the analyzing apparatus is transmitted to each of the terminals and because the terminal may perform communications with the need to analyze the status of the network to which the terminal is connected.

Additionally, when the terminal transmits information from other networks to the first network, even if the transmitted bit array included highly confidential information, the information will be masked or encoded. Therefore, there is an effect of monitoring the network while maintaining confidentiality.

DETAILED DESCRIPTION OF THE PREFERRED EMBODIMENTS OF THE INVENTION

Next, the communication monitoring apparatuses according to the preferred embodiments of the present invention will be explained with reference to drawings.

Embodiment 1

Figure 1:
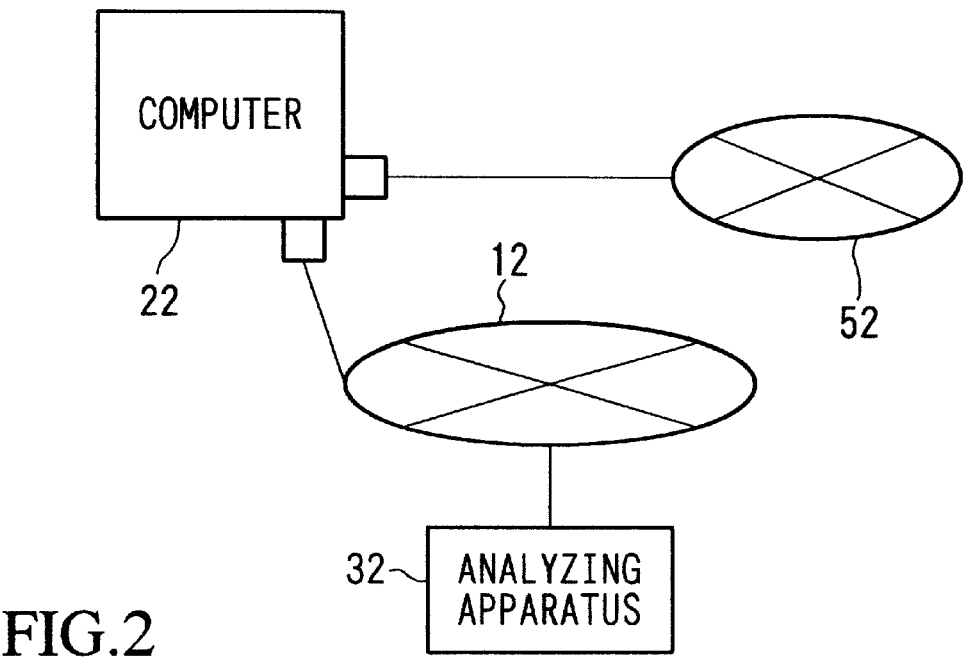
FIG. 1 is a block diagram which illustrates a simplified version of a communication monitoring apparatus according to the first preferred embodiment of the present invention.

FIG. 1 is a block diagram which illustrates the structure of a simplified version of a communication monitoring apparatus according to the first preferred embodiment of the present invention. In FIG. 1, 12 may be, for example, a network which forms a LAN using cables such as 10BASE-T, and 52 may be, for example, a network which forms a LAN using wireless transmission.

22 is a computer which is connected to both the network 22 and the network 52, and which mounts a communication apparatus for the above mentioned wireless LAN in order to perform communications with other computers connected to the network 52 which may be a wireless LAN and such. This computer 22 is simply the computer 20 in FIG. 4 which now mounts a communication apparatus for the above mentioned wireless LAN. The computer 22 may also be a terminal or a relaying apparatus/connecting apparatus.

In addition, the computer 22 possesses a function for transmitting the bit array sent from the network 52 to the computer 22 by employing a communication protocol used in the network 12.

Figure 4:
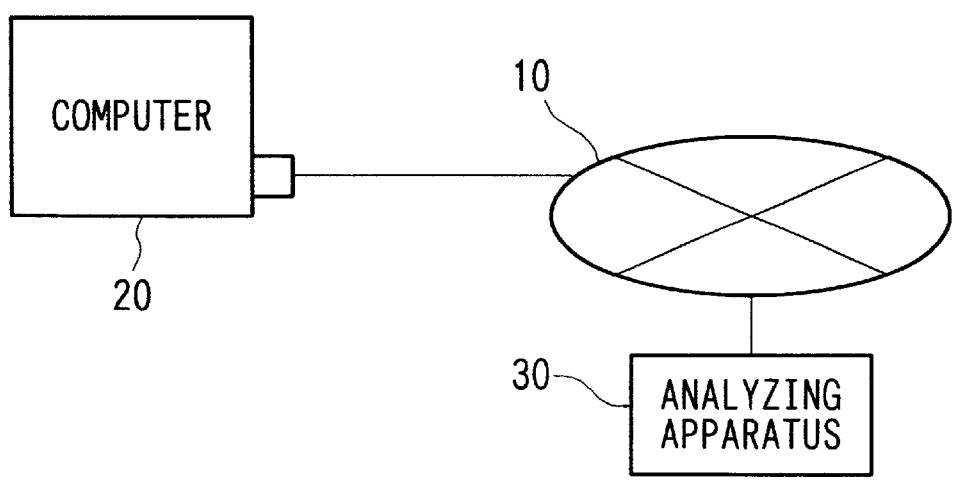
FIG. 4 is a diagram which illustrates a simplified version of the structure of a typical communication monitoring apparatus within a LAN.

32 is an analyzing apparatus which is identical to the analyzing apparatus 30 illustrated in FIG. 4, and is connected to the network 12, and monitors the communication status within the network 12. It is also a console which possesses a processing means for a network administrator. The above mentioned processing means may be, for example, a software which collects data concerning the amount of communication performed within the network 12 in terms of time.

In the above mentioned structure, the analyzing apparatus 32 complies with the instructions of the network administrator and collects data indicating the status of the communications within the network 12 and performs a process for analyzing the status of the communications within the network 12.

The collecting of data pertaining to the status of the communications within the network 52 is performed directly by the computer 22, and the computer 22 receives the bit array from the network 52. This bit array may include, for example, information of headers, trailers, payloads, and such of frames or packets which are the communication protocol used in the network 52 or error correcting codes or checksum codes. When the computer 22 receives the above mentioned bit array, it then transmits this bit array to the analyzing apparatus 32 using the communication protocol used in the network 12.

Next, the analyzing apparatus 32 receives the bit array transmitted from the computer 22. Since the received bit array includes information of headers, trailers, payloads, ard such of frames or packets which arcade communication protocol used in the above mentioned network 52 or error correcting codes or checksum codes, it is possible to perform the monitoring of the network 52.

In this manner, the analyzing apparatus 32 analyzes the amount of code, the rate of occurrence of errors, and the number of times of retransmission by the received information indicating the status of the communication, begins the evaluation of the quality of the communications with the network 52, creates statistics on the information such as the types of packets, the application categories, and the charging amount, and performs monitoring of access rights, security, and such.

The structure of the communication monitoring apparatus is appropriate to the structure illustrated in FIG. 1 when the amount of communication of the network 12 is sufficiently greater than the amount of code of the bit array transmitted from the computer 22 to the analyzing apparatus 32. In addition, when it is not necessary to analyze all the bit arrays sent from the network 52 to the computer 22, it is possible to decrease the amount of bit codes transmitted from the computer 22 to the analyzing apparatus 32 by means of transmitting a portion of the bit array which the computer 22 receives to the analyzing apparatus 32.

The above described computer 22 may also be a terminal or relaying apparatus/connecting apparatus such as routers or repeaters.

As described above, the communication monitoring apparatus according to the first embodiment of the present invention has an analyzing apparatus 32 which uses an analyzing apparatus that is identical to the analyzing apparatus 30 used conventionally, and has a computer 22 which adds an apparatus for converting communication protocols between networks. In addition, the computer 22, unlike the conventional method, does not require an apparatus for creating management information tables or network management protocols to manage the network. And by a minor addition to the resources of the conventional method, the present invention is able to widen the range of the network which is monitored.

Embodiment 2

Figure 2:
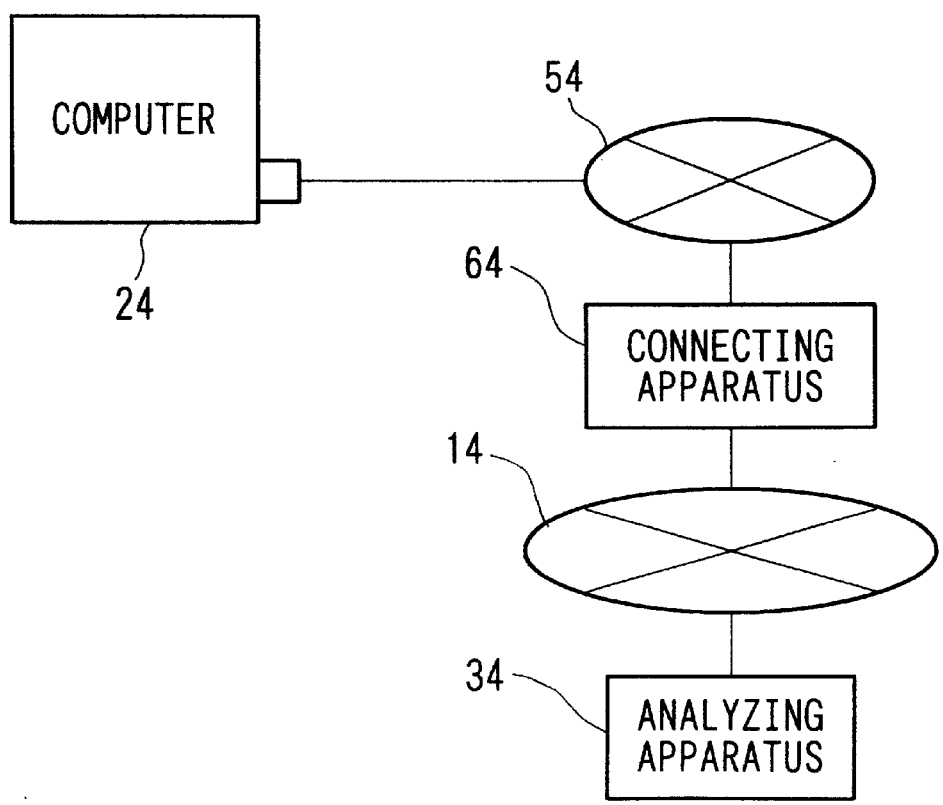
FIG. 2 is a block diagram which illustrates a simplified version of a communication monitoring apparatus according to the second preferred embodiment of the present invention.

FIG. 2 is a block diagram which illustrates the structure of a simplified version of a communication monitoring apparatus according to the second preferred embodiment of the present invention. According to FIG. 2, 14 may be, for example, a network which forms a LAN using cables such as 10BASE-5, and 54 may be, for example, a network which forms a mobile communication network where mobile terminals are connected to each through wireless transmission.

24 is a computer connected to the network 54, and performs communications with other computers (not shown in diagram) by using the communication protocol used within the network 54. This computer 24 may be, for example, a portable terminal which can be mobile, and performs communications with other computers through wireless transmission. Here, the computer 24 need not be limited to portable terminals, and may be, for example, a base station or such.

34 is an analyzing apparatus connected to the network 14, and is an analyzing apparatus which is identical to that illustrated in FIGS. 1 and 4. This analyzing apparatus 34 monitors the network 14 by employing the communication protocol used within the network 14.

In addition, 64 is a connecting apparatus, and is connected in between the network 14 and the network 54. This connecting apparatus possesses a function for converting a communication protocol used in one network to conform to the communication protocol used in the other network.

In the above mentioned structure, the analyzing apparatus 34 complies with the instructions of the network administrator and collects data indicating the status of the communications within the network 14, and performs a process of analyzing the status of communications within the network 14.

The collecting of data pertaining to the status of the communications within the network 54 is performed directly by the computer 24, and the computer 24 receives the bit array from the network 54. This bit array may include, for example, information of headers, trailers, payloads, and such of frames or packets which are the communication protocol used in the network 54 or error correcting codes or checksum codes. When the computer 24 receives the above mentioned bit array, it then transmits this bit array into the network 54 with the destination set for the analyzing apparatus 34.

The bit array sent from the computer 24 is received by the connecting apparatus 64. The connecting apparatus 64 converts the received bit array into a format which complies to the communication protocol used within the network 14 and sends the bit array to the network 14. The analyzing apparatus 34 receives the bit array sent from the connecting apparatus 64. Since the bit array received by the analyzing apparatus 34 includes information of headers, trailers, payloads, and such of frames or packets which are the communication protocol used in the above mentioned network 54 or error correcting codes or checksum codes, it is possible for the analyzing apparatus 34 to perform the monitoring of the network 54.

In this manner, the analyzing apparatus 34 analyzes the amount of code, the rate of occurrence of errors, and the number of times of retransmission by the received information indicating the status of the communication collected by the computer 24, begins the evaluation of the quality of the communications with the network 54, creates statistics on the information such as the types of packets, the application categories, and the charging amount, and performs monitorings of access rights, security, and such.

The structure of the communication monitoring apparatus is appropriate for that illustrated in FIG. 2 when the computer 24 is a computer which has restrictions in scale such as in portable terminals.

The above mentioned network 14 is generally employed within organizations such as corporations and schools, and the analyzing apparatus 34 is managed by administrators within those organizations. In addition, networks having mobile terminals such as the network 54 are usually managed by communication professionals. When a network administrator who is using the analyzing apparatus 34 wants to know about the status of the communications of a portable terminal which is being used by a fellow worker within an organization, it was not possible to easily obtain information relating to the status of the communications of mobile networks. However, with the structure of the second embodiment of the present invention, it is possible to analyze the information relating to the status of the communications of the computer 24 by using the analyzing apparatus 34.

As described above, the communication monitoring apparatus according to the second preferred embodiment of the present invention, the analyzing apparatus 34 uses an analyzing apparatus which is identical to the convention analyzing apparatus 12. In addition, since the conversion between the communication protocol used within the network 14 and the communication protocol used within the network 54 is performed by the analyzing apparatus 64, it is possible to make the scale of the computer 24 smaller than the scale of the computer 22 illustrated in FIG. 1. Additionally, unlike the conventional method, the computer 24 does not require an apparatus for creating management information tables or network management protocols for managing the network. Therefore, it is desirable in cases where the scale of the computer 24 cannot be made larger. And furthermore, by a minor addition to the resources of the conventional method, the present invention is able to widen the range of the network which is monitored.

Embodiment 3

Figure 3:
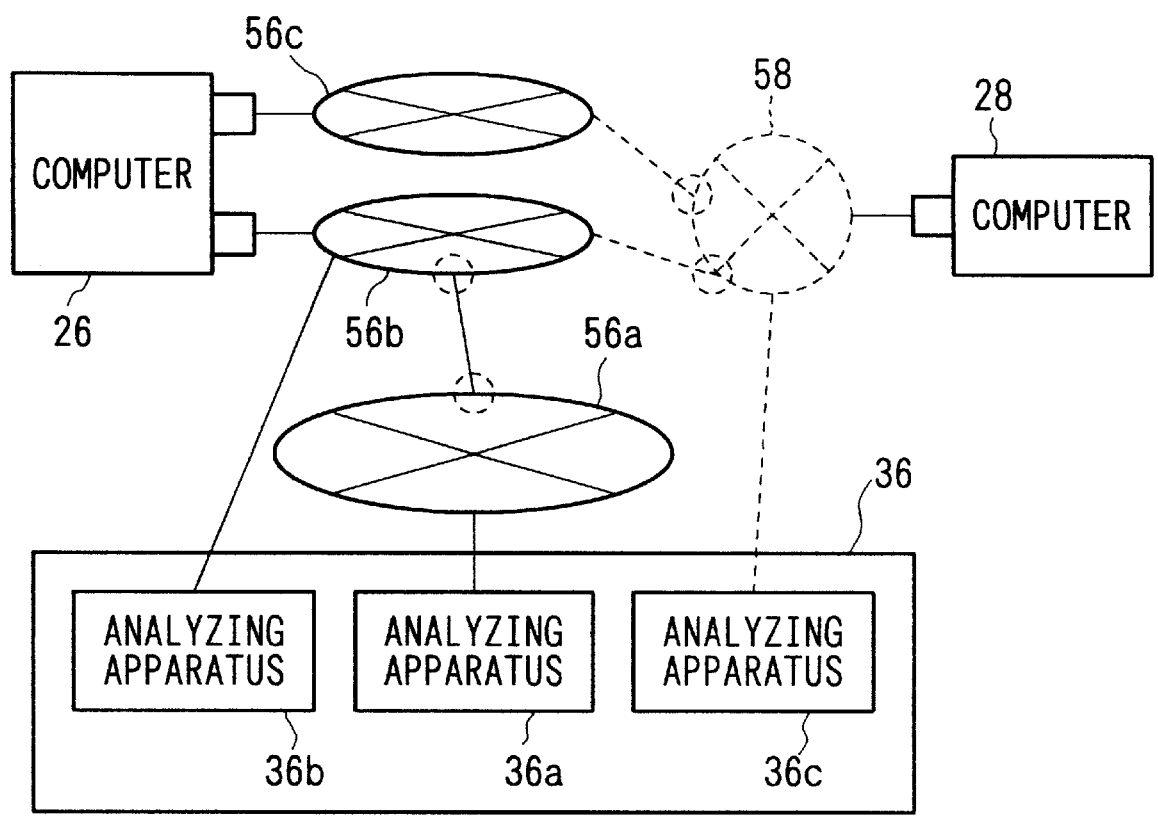
FIG. 3 is a block diagram which illustrates a simplified version of a communication monitoring apparatus according to the third preferred embodiment of the present invention.

FIG. 3 is a block diagram which illustrates the structure of a simplified version of a communication monitoring apparatus according to the third preferred embodiment of the present invention. In FIG. 3, the computer 26 is a computer which is identical to the computer 22 illustrated in FIG. 1. And the computer 28 is a computer which is identical to the computer 24 illustrated in FIG. 2. As shown in FIG. 3, the computer 26 is connected to the network 56b and the network 56c, while the computer 28 is connected to the network 58. In addition, the network 56b and the network 58 are connected together, and the network 56c and the network 58 are also connected together.

Furthermore, the network 56a is connected to the networks 56b, 56c, 58. The analyzing apparatus 36 which is connected to the network 56a possesses an analyzing apparatus 36a, an analyzing apparatus 36b, and an analyzing apparatus 36c, divides the analyzing process, and mutually communicates the analysis result. The analyzing apparatus 36a is connected to the network 56a; the analyzing apparatus 36b is connected to the network 56b; and the analyzing apparatus 36c is connected to the network 58. The analyzing apparatus 36 monitors the status of the communications of the network 56b and the network 56c according to the following explanation.

Below, the operation of the analyzing apparatus 36 when monitoring the status of the communications of the network 56b and the network 56c will be explained.

The computer 26 collects the information sent to it through the network 56b or the network 56c. Then, it transmits the demodulated and received bit array to the analyzing apparatus 36b using the communication protocol of the network 56b. Accordingly, the analyzing apparatus 36b receives the bit array which was previously received by the computer 26. According to the processing load or the traffic of the network 56b or the mutual connection traffic between the network 56b and the network 56a, the analyzing apparatus 36b transfers the bit array to the analyzing apparatus 36a, where the analyzing apparatus 36a executes the analyzing process, or the analyzing apparatus 36b transmits the analysis result of the analyzing process performed by the analyzing apparatus 36b to the analyzing apparatus 36a.

When the capacity of the mutual connection traffic between the network 56a and the network 56b is small, it is desirable to have the computer 26 and the analyzing apparatus 36b be connected to the same network 56b, because the analysis result of the analyzing process performed by the analyzing apparatus 36b can be transmitted to the analyzing apparatus 36a.

In this manner, the analyzing apparatus 36 may analyze the status of the communications of the network 56b and the network 56c. In other words, it is obvious that the analyzing apparatus 36 can analyze the status of the communications of the network 56a, but it can also analyze the status of the communications of the network 56b and the network 56c.

In addition, the analysis result of the analyzing apparatus 36 is transmitted to the computer 26. The reason why the analyzing apparatus 36 sends the analysis result to the computer 26 is because, as explained above, since the analyzing apparatus 36 monitors the status of the communications of the networks 56a, 56b, 56c unitarily, the information which aides in the execution of a normal communication between the computer 26 and the computer 28 is offered to the computer 26.

In the structure illustrated in FIG. 3, in order to have the computer 36 perform communications with the computer 28, either the network 56b or the network 56c needs to be selected. With regard to which network, the network 56b or the network 56c, is appropriate for performing communications, there is a need to consider such points as the amount of data, the communicating time interval, and the cost of communications, depending upon the objective of the communication. In addition, the characteristics of the network continually changes due to the updating of equipment and characteristics of the traffic and the wireless transmission continually changes due to the changes in the physical environment. This type of information cannot be easily obtained by the users of the computer 26.

In addition, when using the computer 26, even if the selection of the network 56b or the network 56c cannot be made based on the accurate comparison result which tracks the instantaneous characteristics of the communications, in most cases if there is some information for judging the comparative selection, that is, as explained above, the information which the analyzing apparatus 36 sends, it would be better than not having any information at all, when aiding in the computer 26's communication.

For example, in the case where the analyzing apparatus 36 analyzes the fact that the rate of packet disposal of the network 56c is high, the computer 26 may select the network 56b as the route for sending data to the computer 28.

The method for selecting the above mentioned route may, for example, include a means for having the computer 26 display the analysis result, thus informing the user about the analysis result sent from the analyzing apparatus 36, and also offering the user a selection between the networks. This method may, instead, have the computer 26 comprise a program which compares the data relating to the status of the network 56b and the network 56c sent from the analyzing apparatus 36, and also a means for altering the values relating to the characteristics of the networks of the analysis result of the analyzing apparatus 36 and for comparing the networks based on the above mentioned program and for automatically switching to the appropriate network based on the comparative result and performing communications.

Furthermore, with respect to FIG. 3, the analysis result which is the analyzed bit array of the computer 26 is transmitted to the computer 28 via the network 58. In this case, where data is sent from the computer 28 to the computer 26, the analysis result which is sent from the analyzing apparatus 36 to the computer 28 is used in selecting whether to use the network 56b or the network 56c.

Other Embodiments

When using the communication protocols of the networks to which are connected the computers 22, 24, 26, 28 from the above described first, second, and third embodiments, there are cases where communications are performed by selecting a plurality of communication protocols.

As an example, the communication protocol of visual code employs a plurality of protocols. Within these communication protocols, there are differences in characteristics such as the amount of code and the codifying process scale and its process delay time, the decodifying process scale and its process delay time, the error preventing properties, and the image quality, and they may also depend of the characteristics of the networks. Depending on the communication objective, the selection of the communication protocol is determined based on whether the amount of data, the communicating time interval, the communication cost and such is appropriate for the image quality.

As with the selection criterion of the networks explained in the third embodiment, for the objective of aiding in the selection of a plurality of communication protocols, the analyzing apparatuses 32, 34, 36 may transmit their analysis results to the computers 22, 24, 26, 28. In this case, the computers 22, 24, 26, 28 may possess means for displaying those analysis results, and users may select the communication protocols based on the displayed analysis results. In addition, the computers 22, 24, 26, 28 may comprise a program which compares the communication protocols based on the analysis results relating to the characteristics of the communication protocols, and also a means for altering the values relating to the characteristics of the communication protocols of these analysis results and for comparing the communication protocols based on tie above mentioned program and for automatically switching to the appropriate, communication protocols based on those comparative results and performing communications.

Further, as explained above, when the computers 22, 24, 26, 28 transmit their received bit arrays to the analyzing apparatuses 32, 34, 36, for the monitoring objective according to the present invention, the communication route may widen to include other networks, and those data are transmitted to computers other than the intended communication partner such as the analyzing apparatuses 32, 34, 36. Therefore, there is a problem when the above mentioned bit arrays include information of high confidentiality.

Hence, when the computers 22, 24, 26, 28 transmit the received bit arrays outside of the networks to which they are connected, a portion of the bit array may be masked or encodified for the objective of monitoring and analyses.

Although embodiments of the present invention have be explained above, the present invention is not limited to the above described embodiments. Modifications may be made arbitrarily within the scope of the present invention. For example, with respect to FIG. 1, an example where an analyzing apparatus 32 monitors one separate network 52 was explained, but this need not be limited to one network. A plurality may exist, and a plurality of computers connected to the network 12 and other networks may also exist. And the analyzing apparatus 32 may monitor the other networks as well.

Additionally, in FIG. 2, although only one network 54 and only one computer 24 and only one connecting apparatus 64 is described, each may comprise a plurality, and may be connected to the network 14, thereby allowing the analyzing apparatus 34 to monitor each of the plurality of networks.

What is claimed is:

1. A communication monitoring apparatus comprising:

terminal which is connected to two networks and which converts a bit array which is demodulated and received from the second network into a predetermined protocol of the first network and transfers the bit array to said first network; and an analyzing apparatus which is connected to said first network and which monitors said second network by receiving and analyzing said bit array transferred from said terminal to said first network, where in the case where a plurality of communication protocols are employed within said second network, said analyzing apparatus further comprises a means for transferring the analyzed analysis result to said terminal; and said terminal further comprises a means for receiving said analysis result transferred from said analyzing apparatus, for selecting a predetermined communication protocol from among said plurality of communications protocols based on said analysis result, and for communicating by employing said selected communications protocol.

2. A communication apparatus comprising:

a connecting apparatus which connects a first network and a second network by acting as a relay between said two networks;

a terminal which is connected to the second network and to each of third thorough Nth networks where N is an integer greater or equal to 3, wherein the terminal transfers a bit array which is demodulated and received from said second network to said second network by using a predetermined protocol of said second network and transfers bit arrays which are demodulated and received from each of said networks to each of said networks based on a predetermined protocol; and an analyzing apparatus which is connected to said first network and which monitors said second through said Nth networks by receiving and analyzing the bit arrays which are transferred from said second through said Nth networks via said connecting apparatus.

3. A communication monitoring apparatus comprising:

a terminal which is connected to first and second networks and to each of third through Nth networks where N is an integer greater or equal to 3, wherein the terminal converts bit arrays which are demodulated and received from each of said second to said Nth networks into a predetermined protocol of said first network and transmits said converted bit arrays into said first network; and an analyzing apparatus which is connected to said first network and which monitors said second through said Nth networks by receiving and analyzing said bit arrays transferred from said terminal to said first network.

4. A communication monitoring apparatus as in either claim 3 or claim 2, wherein:

said analyzing apparatus transfers said analyzed analysis result to said first network; and said terminal receives said analysis result transferred from said analyzing apparatus in performs communications by selecting a network from among said second through said Nth networks.

5. A communication monitoring apparatus in accordance with claim 4, wherein said terminal is connected to a predetermined network from among said second through said Nth networks, receives said analysis result transferred from said analyzing apparatus, and performs communications by selecting a network from among said second through said Nth networks.

6. A communication monitoring apparatus as in either claim 3 or claim 2, where after a partial masking or an encoding process, said terminal transmits to said analyzing apparatus the bit array which is demodulated and received from said second through said Nth networks.

7. A communication monitoring apparatus comprising:

a connecting apparatus which connects a first network and a second network by acting as a relay between said two networks;

a terminal which is connected to said second network and which transfers a bit array which is demodulated and received from said second network to said second network by using a predetermined protocol of said second network; and an analyzing apparatus which is connected to said first network and which monitors said second network by receiving and analyzing said second bit array transferred to said first network via said connecting apparatus where in the case where a plurality of communication protocols are employed within said second network, said analyzing apparatus further comprises a means for transferring the analyzed analysis result to said terminal; and said terminal further comprises a means for receiving said analysis result transferred from said analyzing apparatus, for selecting a predetermined communication protocol from among said plurality of communications protocols based on said analysis result, and for communicating by employing said selected communications protocol.

* * * * *